United States Patent
Strasser

(10) Patent No.: US 8,649,929 B2
(45) Date of Patent: Feb. 11, 2014

(54) MOTOR VEHICLE WITH ALL-WHEEL DRIVE

(75) Inventor: Sebastian Strasser, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/877,551

(22) PCT Filed: Sep. 9, 2011

(86) PCT No.: PCT/EP2011/004542
§ 371 (c)(1),
(2), (4) Date: Jun. 26, 2013

(87) PCT Pub. No.: WO2012/045386
PCT Pub. Date: Apr. 12, 2012

(65) Prior Publication Data
US 2013/0325232 A1  Dec. 5, 2013

(30) Foreign Application Priority Data
Oct. 4, 2010 (DE) .......................... 10 2010 047 443

(51) Int. Cl.
*B60L 11/00*  (2006.01)
(52) U.S. Cl.
USPC .......................................... 701/22; 903/930
(58) Field of Classification Search
USPC ................ 701/22; 903/930, 947; 180/65.265, 180/65.21, 65.275, 65.31, 165; 475/221; 303/151, 152
See application file for complete search history.

(56) References Cited

U.S. PATENT DOCUMENTS

| | | | |
|---|---|---|---|
| 6,047,231 A * | 4/2000 | Rodrigues et al. ............... | 701/69 |
| 6,454,364 B1 | 9/2002 | Niwa et al. | |
| 6,575,870 B2 | 6/2003 | Kitano et al. | |
| 7,143,855 B2 | 12/2006 | Hopper | |
| 8,012,057 B2 | 9/2011 | Meixner | |
| 2003/0062770 A1* | 4/2003 | Sasaki et al. ................... | 303/152 |
| 2006/0142119 A1 | 6/2006 | Meixner | |
| 2010/0113215 A1 | 5/2010 | Jäger et al. | |
| 2010/0131165 A1 | 5/2010 | Salman et al. | |
| 2010/0191434 A1 | 7/2010 | Fujita et al. | |
| 2012/0035820 A1 | 2/2012 | Falkenstein | |

FOREIGN PATENT DOCUMENTS

| | | |
|---|---|---|
| DE | 101 35 436 A1 | 1/2002 |
| DE | 101 45 157 A1 | 4/2002 |
| DE | 102 60 196 A1 | 7/2004 |
| DE | 103 04 813 A1 | 8/2004 |
| DE | 10 2004 024 086 A1 | 12/2005 |
| DE | 10 2005 025 617 A1 | 12/2006 |
| DE | 10 2005 057 285 A1 | 3/2007 |
| DE | 10 2006 018 661 A1 | 10/2007 |
| DE | 10 2008 017 480 A1 | 10/2008 |
| DE | 10 2009 000 044 A1 | 7/2010 |

(Continued)

*Primary Examiner* — Marthe Marc-Coleman
(74) *Attorney, Agent, or Firm* — Henry M Feiereisen LLC

(57) ABSTRACT

In a vehicle having an all-wheel drive system in which the front axle and the rear axle of the vehicle can be driven with differently sized front-axle and rear-axle torques, a rotational-speed difference between a front-axle-side rotational speed and a rear-axle-side rotational speed is established from a torque difference between the front-axle and rear-axle torques. The vehicle includes a unit for determining a road friction coefficient, which unit measures the rotational-speed difference and determines the road friction coefficient based on a value pair derived from the rotational-speed difference and the torque difference or determined from a parameter correlating therewith.

8 Claims, 4 Drawing Sheets

(56) References Cited

FOREIGN PATENT DOCUMENTS

| | | |
|---|---|---|
| JP | 2008-301564 A | 12/2008 |
| JP | 2010-241166 A | 10/2010 |
| WO | WO 2004/022373 A1 | 3/2004 |
| WO | WO2004/039621 A1 | 5/2004 |
| WO | WO 2004/069576 A1 | 8/2004 |

* cited by examiner

MOTOR VEHICLE WITH ALL-WHEEL DRIVE

CROSS-REFERENCES TO RELATED APPLICATIONS

This application is the U.S. National Stage of International Application No. PCT/EP2011/004542, filed Sep. 9, 2011, which designated the United States and has been published as International Publication No. WO 2012/045386 and which claims the priority of German Patent Application, Serial No. 10 2010 047 443.6 filed Oct. 4, 2010, pursuant to 35 U.S.C. 119(a)-(d).

BACKGROUND OF THE INVENTION

The invention relates to a vehicle with an all-wheel drive and to a method for determining a road friction coefficient.

In vehicles with a hybrid drive system, comprised of an internal combustion engine and an electric machine, the electric machine is able to induce in a recuperation mode the kinetic energy of the vehicle into electric energy onto the vehicle wheels while at the same time imposing a recuperation or drag torque. In a vehicle with all-wheel drive system, therefore, not only the drive torque but also concept-dependent portions of the drag torque can be transferred onto the front axle and/or rear axle. These drag torques may cause high brake slip especially when a road surface has a low friction coefficient. This in turn results in a decrease of the cornering force and thereby in an unstable driving behavior.

DE 103 04 813 A1 discloses a generic type of a vehicle with all-wheel drive system. The drive system has an interaxle differential which distributes the driving torque to a front axle differential and a rear axle differential, via which the front wheels and the rear wheels are driven. The interaxle differential has a clutch which influences the driving torque distribution. The clutch can be operated in dependence on operating parameters of the vehicle for variable distribution of the drive torques.

The front-axle and rear-axle transmissions are translated differently in DE 103 04 813 A1. These differently translated axle drives cause a differential number between the axles, when the clutch is actuated with a differential torque. The differential torque can be implemented in deviation to the DE 103 04 813 A1 and also in the invention optionally also without the use of such a clutch or different axle ratios.

To carry out ESP control or ABS control, the provision of wheel sensors is already standard in modern vehicles to ascertain the rotational speeds of the front and rear wheels during normal driving. As however the actual road friction coefficient and the recuperation torque that can at most be transferred onto the road surface are not known, the recuperation capability of the hybrid drive and thus the possible efficiency advantage is limited in each driving situation so as to prevent an unstable driving behavior. As a result, storage in an on-board electrical system of the electric energy recovered in during the recuperation mode is inevitably limited.

SUMMARY OF THE INVENTION

The object of the invention is to provide a vehicle or a method by which a simple determination of the road friction coefficient is possible.

The object is attained with a vehicle having an all-wheel drive. The vehicle includes a front axle driven with a front-axle torque, a rear axle driven with a rear-axle torque different from the front-axle torque, wherein a torque difference between the front-axle torque and the rear-axle torque generates a rotational-speed difference between a front-axle-side rotational speed and a rear-axle-side rotational speed. The vehicle further includes a friction-determining unit which measures the rotational-speed difference and determines a road friction coefficient based on a value pair derived from the rotational-speed difference and the torque difference, or based on a parameter correlated with the rotational-speed difference and the torque difference, and at least one electric machine generating a drive torque of the vehicle and inducing in a recuperation mode an electrical voltage while exerting a recuperation torque onto vehicle wheels of at least one of the front axle and the rear axle, as well as a recuperation manager associated with the electric machine. The recuperation manager limits the recuperation torque to an upper limit value representing a maximum transferable recuperation torque, wherein the maximum transferable recuperation torque or a distribution of the recuperation torque onto the front axle and the rear axle is varied as a function of the determined road friction coefficient.

The object is also attained with a method for the determining a road friction coefficient in a vehicle. The method includes the steps of driving a front axle with a front-axle torque, and driving a rear axle with a rear-axle torque different from the front-axle torque, wherein a torque difference between the front-axle torque and the rear-axle torque produces a rotational-speed difference between a front-axle-side rotational speed and a rear-axle-side rotational speed, measuring the rotational-speed difference between a front-axle-side rotational speed and a rear-axle-side rotational speed, determining a road friction coefficient based on a value pair derived from the measured rotational-speed difference and the torque difference, or based on a parameter correlated with the measured rotational-speed difference and the torque difference, generating with an electric machine a drive torque of the vehicle and inducing in a recuperation mode an electrical voltage while exerting a recuperation torque onto vehicle wheels of at least one of the front axle and the rear axle, limiting with a recuperation manager the recuperation torque to an upper limit value representing a maximum transferable recuperation torque, and varying the maximum transferable recuperation torque or a distribution of the recuperation torque onto the front axle and the rear axle as a function of the determined road friction coefficient.

The invention is based on the facts that a difference in torque between the front axle and the rear axle causes different front-axle-side and rear-axle-side rotational speeds. Front-axle-side and rear-axle-side rotational speeds are to be understood for example as the rotational speeds of the front and rear wheels of the vehicle. As an alternative, the rotational speeds of output shafts are to be understood that are guided by an interaxle differential to a front axle differential and a rear axle differential.

The rotational speed differences between front and rear axles as well as the respectively associated torque differences establish value pairs. On the basis of studies, it was found that the afore-mentioned value pairs allow inference about the actual friction coefficient of the road, when road surfaces have surface properties that are unknown per se. The invention is thus based on the recognition that great differences in rotational speeds are encountered between the front-axle-side and rear-axle-side rotational speeds, when road surfaces with different friction coefficients and constant torque difference are involved. According to the characterizing part of patent claim 1, the vehicle has now a unit for determining a road friction coefficient to ascertain the difference in rotational speed between the front-axle-side and rear-axle-side rotational speeds. The unit is designed so that road friction coefficient can be determined on the basis of the detected rotational speed difference and the associated torque difference between front-axle and rear-axle driving torques. The thus-determined friction coefficient can be considered as an additional parameter in various control processes. A rough estimate as to whether the road surface has a low friction coefficient, a mean friction coefficient, or a high friction coefficient is already significant to improve the quality of control operations.

The actual torque difference encountered between front and rear axles can be detected only with great effort when using sensor technology. The afore-mentioned unit thus determines the friction coefficient not on the basis of the actual torque difference but of a predefined desired torque difference and the resultant rotational speed actual difference which can easily be measured by using, for example, wheel speed sensors.

For determining the friction coefficient, the unit according to the invention can store a characteristic diagram in tabular form, from which on the basis of the value pair, comprised of the set torque difference between front-axle and rear-axle drive torques and the measured rotational speed difference, the friction coefficient of the road surface can be estimated. As mentioned above, a rough classification into high friction coefficient, mean friction coefficient, or low friction coefficient suffices already.

The afore-mentioned characteristic diagram can be determined empirically from experiments, on the basis of road surfaces of known high, mean or low friction coefficients and of predefined different torque differences obtained, for example, from characteristic diagram of tires. The value pairs from torque differences and associated rotational speed differences are entered in the characteristic diagram. As a result, value pair groups are established in the characteristic diagram for the respectively known high, mean, and low friction coefficients and lie at different locations in the characteristic diagram. Through extrapolation, each of the high friction coefficient, mean low friction coefficient, and low friction coefficient value pair groups can be represented as a friction-coefficient field in the characteristic diagram.

The characteristic diagram determined in the afore-mentioned test mode can form the basis for friction-coefficient determination during normal driving operation. In this case, a value pair is acquired from torque difference and rotational-speed difference.

The value pair is entered in the characteristic diagram as intersection point which finds itself either in the high friction-coefficient field, in the low friction-coefficient, or in the mean friction-coefficient field.

As an alternative or in addition, the friction coefficient can be calculated on the basis of tire characteristic diagrams and analytical correlations of friction coefficient, starting from torque differences and rotational-speed differences. Scatter, inaccuracies of the system, and changes of vehicle and tire data may also be considered when calculating or empirically determining the characteristic diagram. In this manner a differential-torque and differential-rotational-speed diagram is obtained as characteristic diagram.

As indicated above, the thus-generated characteristic diagram can be estimated during normal driving as follows: First, the rotational-speed difference resulting from the differential torque is determined. These two actual values are entered in the characteristic diagram stored in the unit. Depending on the road surface, the value pair from the differential torque and the resulting actual rotational-speed difference, lies in the high friction-coefficient field, in the mean friction-coefficient field, or in the low friction-coefficient. As a consequence, it is possible to estimate whether the vehicle moves with the value pair on a roadway with high, mean, or low friction coefficients.

According to the invention, the rotational-speed difference between a front and rear-axle rotational speed is used to determine the friction coefficient. For an easy determination of the rotational-speed difference, wheel sensing can preferably be used, which are anyway installed in the vehicle to enable ABS or ESP control. Accordingly, this embodiment does not require the provision of additional sensor elements for determining the rotational-speed difference.

The all-wheel drive system of the vehicle can have a torque distribution unit with which based on an input a drive torque distribution of the drive torque to the front axle and to the rear axle can be adjusted and/or changed. To enable determination of a friction coefficient, it should be ensured to set a torque difference between the axles at least when ascertaining the actual rotational-speed difference.

In one embodiment, the torque distribution unit may be an electronic computing unit which, based on different operating parameters, controls a front-axle drive and a rear-axle drive such that the predefined total drive torque is obtained. Alternatively, the torque distribution unit may be formed as an interaxle differential which divides the drive torque to a front-axle differential and a rear-axle differential. The front and rear wheels are again driven via the front and rear-axle differentials. In this case, interaxle differential may, for example, have a clutch that impacts the output torque distribution. The clutch can be controlled depending on the operating parameters of the vehicle for the variable distribution of the drive torques and upon activation leads to a rotational-speed difference.

With such a designed drive system, the differential torque can easily be acquired from a transmission output torque, which is directed into the interaxle differential, and the clutch torque of the clutch integrated in the interaxle differential.

The estimation of the friction coefficient in accordance with the invention is advantageous in particular with regard to an increase in the recuperation capability of an electric machine used in the drive system. As it is known, the electric machine can be used not only as a motor, but also as a generator that induces during recuperation operation and application of a recuperation torque onto the vehicle wheels of the front and/or rear axles electric energy which is stored in the on-board electrical system. The recuperation torque of drag torque may cause high brake slip, in particular when road surfaces with low friction coefficient are involved so that a cornering force is reduced and unstable driving behavior may be experienced. As there is no information in conventional vehicles about the actual friction coefficient, the maximum possible recuperation torque is limited for safety reasons to a limit value, which does not result in unstable driving behavior even under adverse driving conditions.

In contrast thereto, according to the invention, the maximum possible recuperation torque is not set to a limit value, rather the maximum recuperation moment that is transferable to the road can be varied depending on the current road friction coefficient. This means that the maximum possible recuperation torque is raised when the road surface has a high friction coefficient as there is risk of excessive brake slip. As a result, additional recuperation capability is generated compared to the state of the art, when a road with high friction coefficient is involved. At the same time, the vehicle stability is ensured regardless of the current friction coefficient.

For carrying out a vehicle deceleration, a braking torque is measured in accordance with the invention by an electronic control device, taking into account the maximum possible recuperation torque, by which braking torque the vehicle wheel brakes must be acted upon to follow the driver's wish. The maximum possible recuperation torque is set by the electronic control device in dependence upon the anticipated friction coefficient.

BRIEF DESCRIPTION OF THE DRAWING

Two exemplary embodiments of the invention are now described with reference to the attached figures.

It is shown in.

DETAILED DESCRIPTION OF PREFERRED EMBODIMENTS

Figure 1:
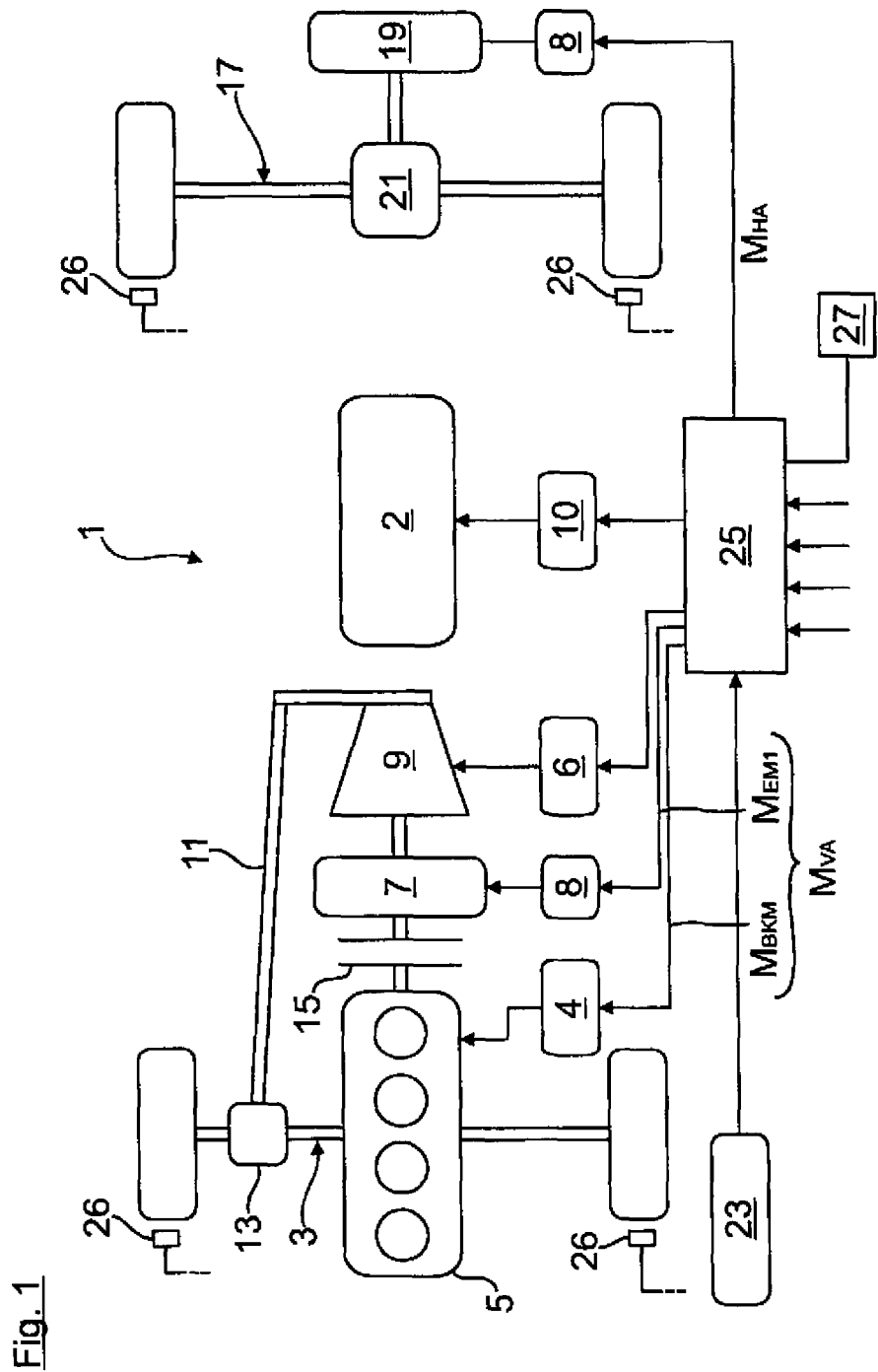
FIG. 1 a schematic view of a drive system of a motor vehicle according to the first exemplary embodiment.

FIG. 1 shows a basic illustration of the drive system of a hybrid vehicle which is provided with an all-wheel drive unit 1. An internal combustion engine 5 and an electric machine 7 are connected in a powertrain at the front vehicle axle 3 and connected to the transmission 9. The transmission 9 is in driving relationship with the vehicle wheels of the front axle 3 via a transmission output shaft 11 and an only indicated axle differential 13. A clutch element 15 is connected between the internal combustion engine 5 and the electric machine 7 and is opened or closed in dependence on the driving situation.

A further electric machine 19 is arranged at the rear axle 17 of the motor vehicle for driving both rear wheels of the vehicle via an axle differential 21.

Insofar as it is necessary for an understanding of the invention, FIG. 1 shows schematically the front axle drive and rear axle drive comprised of the electric machine 19. Further drive components, such as the high-voltage battery 2 for the power supply of the two electric machines 7, 19, or also the engine control unit 4, the transmission control unit 6, the power electronics 8 of both electric machines 7, 19, or the battery control unit 10, are only roughly hinted without further description.

A central electronic control device 25 is provided for controlling the drive assemblies 5, 7, 19. The control device 25 detects the driver's wish, indicated by way of example in FIG. 1 by using a pedal module 23 to make a driver-side change of the accelerator pedal angle. Additionally, the control device 25 detects as input parameters i.a. an available battery power, efficiency ranges of all drive assemblies 5, 7, 19, ambient and assembly temperatures, limits to driving dynamics, etc., thereby enabling an axle-related drive torque distribution.

On the basis of these input variables, the control device 25 computes a differential torque $\Delta M$ and resulting therefrom a target drive torque $M_{VA}$ for the front axle 3 and a target drive torque $M_{HA}$ for the rear axle 17.

According to the FIG. 1, wheel sensors 26 are respectively assigned to the front wheels and the rear wheels. The wheel sensors 26 are in communication by signals with the electronic control device 25 for executing an ABS or EPS control. Moreover, the electronic control device 25 is connected by signals to a unit 27 for determining the friction coefficient of the road surface.

The torque distribution carried out by the control device 25 is realized in dependence on input parameters which are known per se and by taking into account parameters of a driver assist control which is not shown in greater detail. The electronic control device 25 enables a axle-related torque distribution. The target torques $M_{VA}$ and $M_{HA}$ generated in the electronic control device 25 for the front and rear axles 3, 17 are respectively conducted independently from one another to the front axle 3 and the rear axle 17.

To determine the friction coefficient in the unit 27, the control device 25 has to drive the rear axle drive 17 with differently sized drive moments $M_{VA}$ and $M_{HA}$. The torque difference $\Delta M$ between the differently sized front and rear torques $M_{VA}$ and $M_{HA}$ is conducted to the unit 27 according to the FIG. 2. In addition, the resulting rotational-speed difference $\Delta n$ between the front wheels and the rear wheels is conducted to the unit 27. The rotational-speed difference $\Delta n$ is also determined in the electronic control device with the assistance of the wheel sensors 26.

Figure 2:
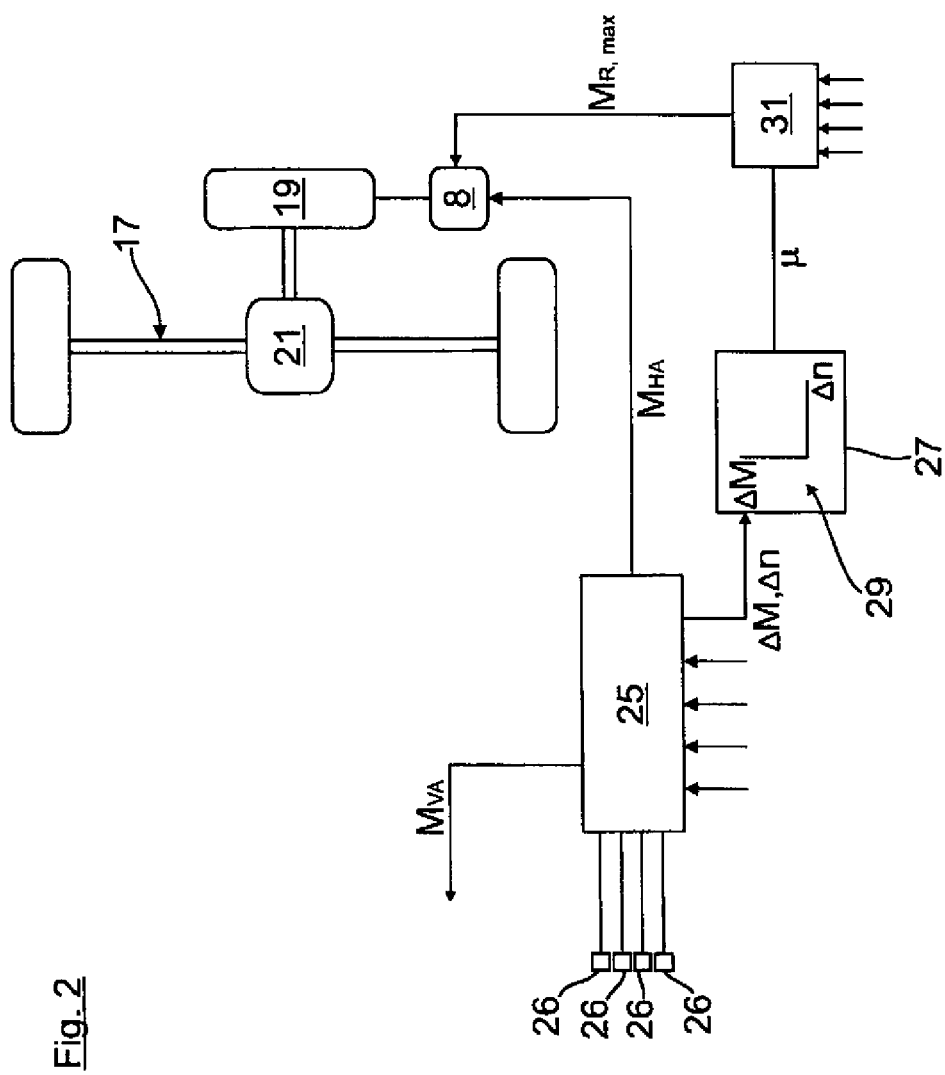
FIG. 2 a block circuit diagram to illustrate the adjustment of the maximum possible recuperation torque of the electric machine for the rear-axle drive.

A characteristic diagram 29, only indicated in FIG. 2, is stored in the unit 27 and will be described later in greater detail with reference to FIG. 3. On the basis of the measured torque difference $\Delta M$ and the measured speed difference $\Delta n$, the characteristic diagram allows estimation as to whether the road surface has a low friction coefficient $\mu_0$, a mean friction coefficient $\mu_1$, or a high friction coefficient $\mu_2$. A high friction coefficient $\mu_2$ is obtained for example on asphalt, while a mean friction coefficient $\mu_1$ occurs on snow, and a low friction coefficient $\mu_0$ occurs on ice.

The friction coefficient estimated in the unit 27 is conducted in FIG. 2 to a recuperation manager 31. The recuperation manager 31 determines in dependence on the acquired friction coefficient a maximum recuperation torque $M_{R,max}$, that is transferable onto the road and that the electric machine 19 is able to transfer on the road in the recuperation mode, without encountering excessive brake slip at the rear axle 17 and resultant unstable driving behavior. The size of the recuperation torque $M_{R,max}$ is dependent on whether a low friction coefficient $\mu_0$, a high friction coefficient $\mu_2$, or a mean friction coefficient $\mu_1$ has been estimated. To avoid excessive brake slip during the recuperation mode, when a low friction coefficient $\mu_0$ is estimated, the maximum recuperation torque $M_{R,max}$ that is transferable to the road is respectively reduced in the recuperation manager 31. Conversely, when a high friction coefficient $\mu_1$ is estimated, the maximum recuperation can raise the maximum possible recovery torque $M_{R,max}$ in order to maximize the possible recuperation capability.

Figure 3:
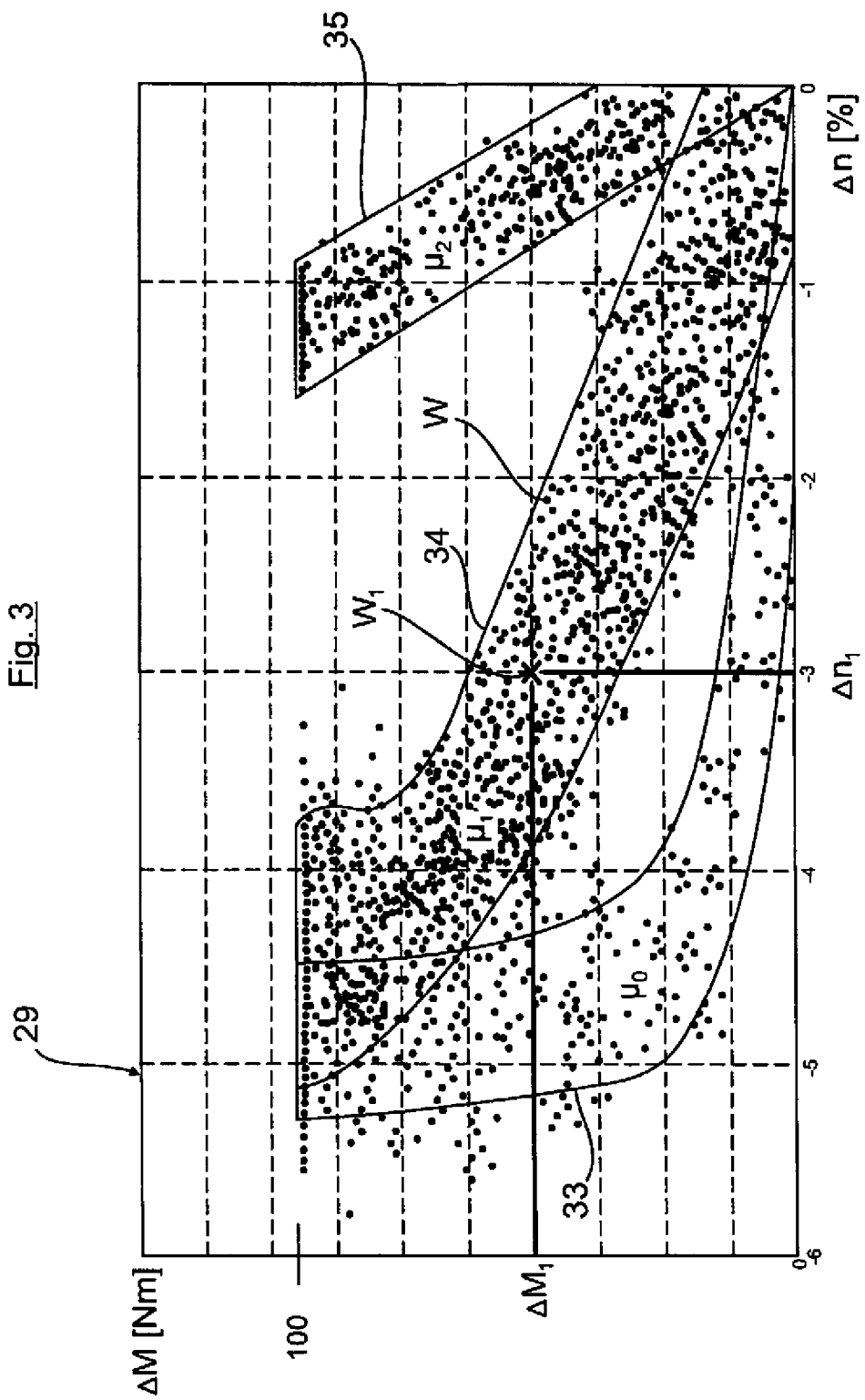
FIG. 3 the characteristic diagram stored in the unit for determining the road friction coefficient.

FIG. 3 shows the characteristic diagram 29 as a torque difference and rotational-speed difference diagram. Plotted in the diagram 29 are friction coefficient fields 33, 34, 35 in correspondence to a low friction coefficient $\mu_0$, a mean friction coefficient $\mu_1$, or a high friction coefficient $\mu_2$. For determining the actual friction coefficient, a value pair W, comprised of the torque difference $\Delta M_1$ and $\Delta n_1$, is read into the unit 27 initially in FIG. 3. FIG. 3 shows by way of example a torque difference $\Delta M_1$ at 50 Nm and the resulting rotational-speed difference $\Delta n_1$ at −3%. The value pair $W_1$ of $\Delta M_1$ and $\Delta n_1$ can be plotted in the characteristic diagram 29 as intersection point which lies in mean friction coefficient field 34. As a result, a mean friction coefficient from the diagram 29, as obtained at a snow-covered road surface.

The diagram 29 shown in FIG. 2 with the different friction coefficient fields 33, 34, 35 is determined empirically by tests, specifically in road surfaces with predefined high friction coefficient $\mu_2$, with predefined mean friction coefficient $\mu_1$, and with predefined low friction coefficient $\mu_0$. With such well-known friction coefficients, differently sized torque differences ΔM are transferred onto the front and rear axles 3, 17. The resultant value pairs W are entered in the characteristic diagram 29 as dots.

As a result, a multiplicity of value pair points W are obtained and shown in FIG. 3 and which are respectively assigned to a known low, high, or mean friction coefficient $\mu_0$, $\mu_1$, $\mu_2$. From there, the friction coefficient fields 33, 34, 35 can be extrapolated in the characteristic diagram 29.

Figure 4:
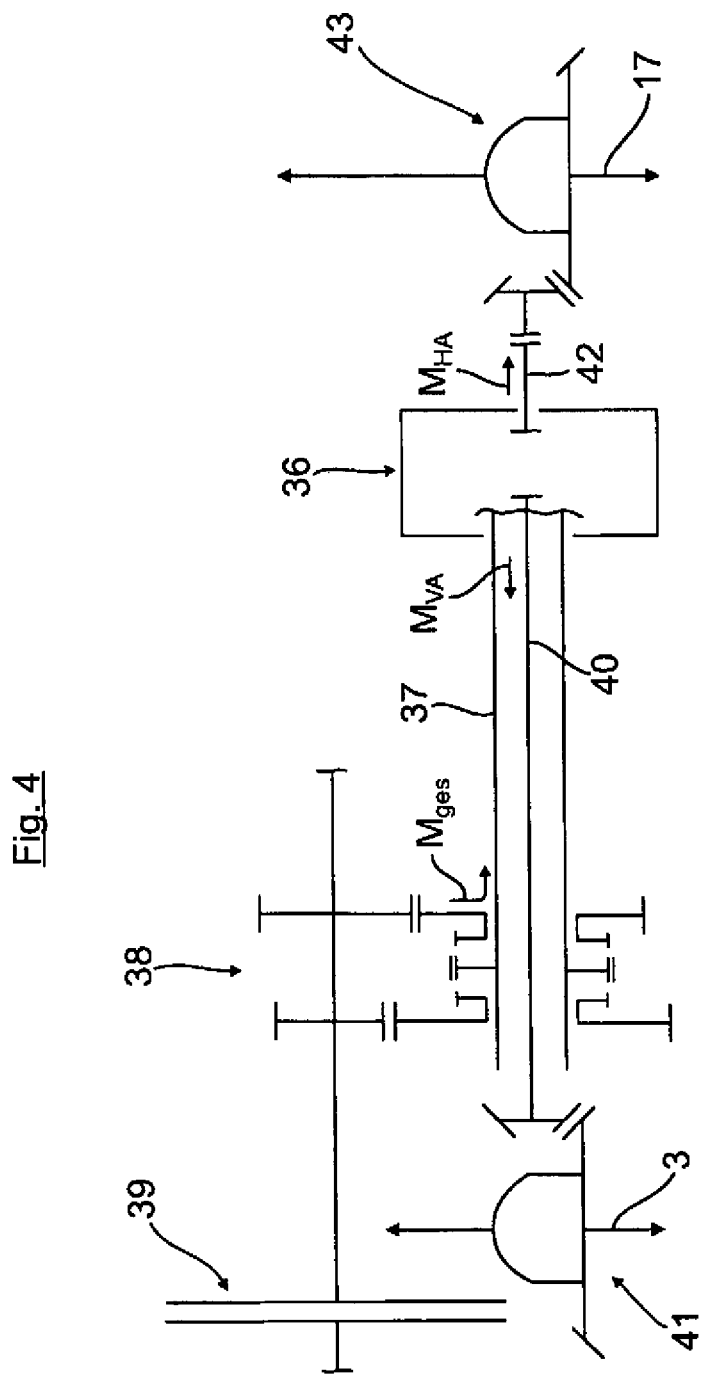
FIG. 4 a schematic illustration of a drive system of a motor vehicle according to the second exemplary embodiment.

FIG. 4 shows the drive system according to a second exemplary embodiment. In this case, the drive torque distribution is implemented not on the basis of an electronic control device 25, but rather with the assistance of a mechanical interaxle differential 36. The interaxle differential 36 is configured as drive shaft in the form of a hollow shaft 37 in connection with a transmission output of a variable speed transmission 38. The transmission 38 is connected to a drive assembly in a manner known per se via a separating clutch. The interaxle differential is connected in driving relationship via an output shaft 40 to a front-axle differential 41 which drives front wheels, not shown. In addition, the interaxle differential 36 is connected via a drive shaft 42 with a rear-axle differential 43, by which the rear wheels can be driven.

Provided in the interaxle differential 36 is a clutch which is not shown in greater detail and impacts the driving torque distribution. Depending on the magnitude of the clutch torque, the difference torque ΔM can be adjusted. The differential torque ΔM can be computed with such a drive system in a particularly simple manner from the transmission output torque $M_{ges}$ and the respectively adjusted clutch torque of the clutch integrated in the interaxle differential 36.

What is claimed:

1. A vehicle with an all-wheel drive system, comprising:
   a front axle driven with a front-axle torque,
   a rear axle driven with a rear-axle torque different from the front-axle torque, with a torque difference between the front-axle torque and the rear-axle torque generating a rotational-speed difference between a front-axle-side rotational speed and a rear-axle-side rotational speed,
   a friction-determining unit which measures the rotational-speed difference and determines a road friction coefficient based on a value pair derived from the rotational-speed difference and the torque difference, or based on a parameter correlated with the rotational-speed difference and the torque difference,
   at least one electric machine generating a drive torque of the vehicle and inducing in a recuperation mode an electrical voltage while exerting a recuperation torque onto vehicle wheels of at least one of the front axle and the rear axle,
   a recuperation manager associated with the electric machine, with the recuperation manager limiting the recuperation torque to an upper limit value representing a maximum transferable recuperation torque, wherein the maximum transferable recuperation torque or a distribution of the recuperation torque onto the front axle and the rear axle is varied as a function of the determined road friction coefficient.

2. The vehicle of claim 1, wherein the friction-determining unit has stored therein a characteristic diagram from which the road friction coefficient can be estimated based on a measured torque difference and a measured rotational-speed difference.

3. The vehicle of claim 2, wherein the characteristic diagram is generated on roads having a known friction coefficient, with the rotational-speed differences being measured for different predetermined torque differences, and with value pairs derived from the predetermined torque differences and the measured rotational-speed differences being entered into the characteristic diagram.

4. The vehicle of claim 1, further comprising wheel sensors associated in one-to-one correspondence with the vehicle wheels on the front axle and on the rear axle and configured to measure the rotational-speed difference when determining the road friction coefficient.

5. The vehicle of claim 1, wherein the all-wheel drive system comprises a torque distribution unit configured to adjust a torque distribution of the drive torque to the front axle and the rear axle in response to a setting requested by a driver of the vehicle, wherein the torque distribution unit sets for determining the road friction coefficient a unequal torque distribution with a self-adjusting torque difference.

6. The vehicle of claim 5, wherein the torque distribution unit is constructed as an interaxle differential which distributes the drive torque as an output torque distribution to a front-axle differential constructed to drive front wheels and a rear-axle differential constructed to drive rear wheels, wherein the interaxle differential comprises a clutch affecting the output torque distribution, wherein the clutch is controllable to variably distribute the drive torques depending on operating parameters of the vehicle.

7. The vehicle of claim 1, further comprising an electronic control device configured to determine a brake torque to be applied to vehicle brakes for decelerating the vehicle, which brake torque takes into account the maximum transferable recuperation torque.

8. A method for the determining a road friction coefficient in a vehicle, the method comprising:
   driving a front axle with a front-axle torque, and driving a rear axle with a rear-axle torque different from the front-axle torque, wherein a torque difference between the front-axle torque and the rear-axle torque produces a rotational-speed difference between a front-axle-side rotational speed and a rear-axle-side rotational speed,
   measuring the rotational-speed difference between a front-axle-side rotational speed and a rear-axle-side rotational speed,
   determining a road friction coefficient based on a value pair derived from the measured rotational-speed difference and the torque difference, or based on a parameter correlated with the measured rotational-speed difference and the torque difference,
   generating with an electric machine a drive torque of the vehicle and inducing in a recuperation mode an electrical voltage while exerting a recuperation torque onto vehicle wheels of at least one of the front axle and the rear axle,
   limiting with a recuperation manager the recuperation torque to an upper limit value representing a maximum transferable recuperation torque, and
   varying the maximum transferable recuperation torque or a distribution of the recuperation torque onto the front axle and the rear axle as a function of the determined road friction coefficient.

* * * * *